L. R. FULDA.
Improvement in Stave-Machines.

No. 126,197. Patented April 30, 1872.

Witnesses
Geo. W. Strong
J. L. Boone

Inventor
Lamartine R. Fulda

UNITED STATES PATENT OFFICE.

LAMARTINE R. FULDA, OF SAN FRANCISCO, CALIFORNIA, ASSIGNOR TO HIMSELF, MARTIN FULDA, AND HENRY C. FULDA, OF SAME PLACE.

IMPROVEMENT IN STAVE-MACHINES.

Specification forming part of Letters Patent No. 126,197, dated April 30, 1872.

SPECIFICATION.

*To all whom it may concern:*

Be it known that I, LAMARTINE R. FULDA, of city and county of San Francisco, State of California, have invented an Improvement in Stave-Machines; and I do hereby declare the following description and accompanying drawing are sufficient to enable any person skilled in the art or science to which it most nearly appertains to make and use my said invention or improvements without further invention or experiment.

The object of my invention is to provide an improved machine for the working or manufacture of cask, tank, and barrel staves, so that the same can be completed ready for use from rough bolts of lumber. It consists in the use of a movable carriage, provided with clamps for holding the rough bolt of wood, this carriage being made to pass the shaping-saw, guided by an adjustable curved gauge, so that the proper shape shall be given the stave. The stave is then laid upon an adjustable table and made to pass a cutter which gives the proper bevel to the edges. From thence it is placed on another curved table and passed under a cutter, which does the crozing, forming the grooves for the head. The first-mentioned carriage has also a device for getting the center line transversely to the stave, for the purpose of setting up correctly.

Figure 1:
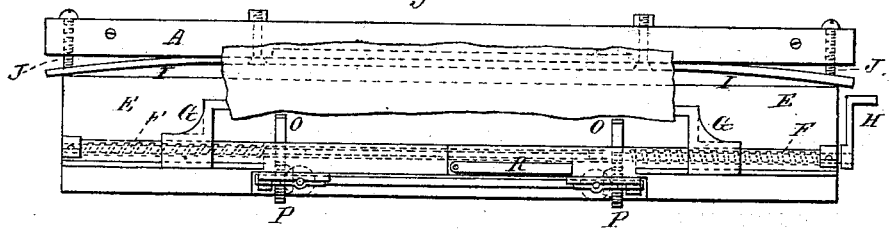
Figure 2:
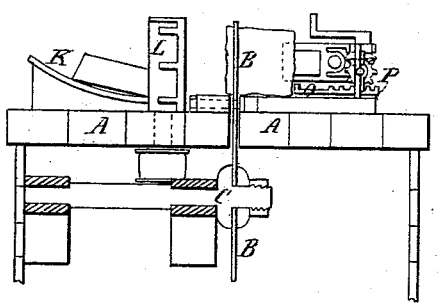
Figure 6:
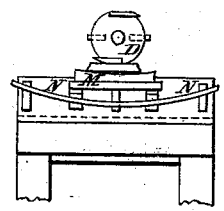
Figure 3:
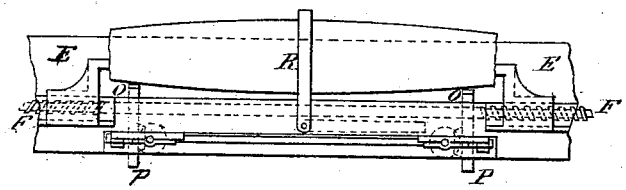
Figure 4:
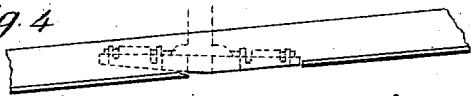
Figure 5:
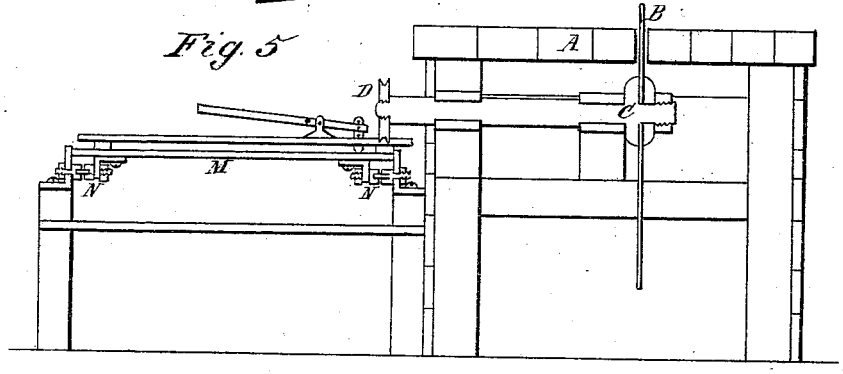

Referring to the accompanying drawing for a more complete explanation of my invention, Figure 1 is a plan of the carriage with a bolt in place. Fig. 2 is an end view of the machine. Fig. 3 shows the method of centering a stave for setting up. Fig. 4 is a form of cutter to be used. Fig. 5 is a side view, showing the crozing apparatus. Fig. 6 is an end view of the same.

A is a sawing-table, either ordinary or constructed especially for the purpose. The saw B is mounted upon an arbor, C, and the outer end of the arbor carries the crozing-cutter D. The carriage E is constructed to support any-sized bolt of rough lumber that may be used, and has a right and left screw, F F, either extending from end to end; or there may be two separate screws, one at each end, and so fitted that they can be operated separately; or they may be united by a short length of gas-pipe when it is desired to operate them together, as is commonly the case. These screws carry the clamp-nuts G, which are forced against the end of the bolt by turning the crank H, thus holding it securely in place. A flexible adjustable guide, I, is secured upon the sawing-table before the saw, and this is made to take a curve corresponding to that desired for the staves, by means of the screws J J. The carriage E, with its bolt, is made to pass the saw, and the guide carries it in the proper curve till the bolt is split into as many staves as possible. The staves may then be laid flat and their edges trimmed. In order to give the edge of the staves the proper bevel, they are laid upon a model, K, which has its upper face of a curved shape corresponding to the diameter desired for the cask. The lower face of the model lies flat upon the table, and a cutter, L, rotating upon a vertical shaft, stands at one side of the model. The stave is then pushed along, being guided by an adjustable steel bar, similar to I. After both edges are finished the stave is ready for crozing, and is then laid upon the model M, which also rests upon adjustable guides or ways N. The object of the curved models is to insure a proper position and bevel for every stave, whether wide or narrow, without taking time to place it exactly in the center of the model. The model M passes beneath the cutter D, carrying the stave at such a height that the groove is formed for the head of the cask. It is then necessary to divide the staves by a transverse line equidistant from the two ends, in order to set the cask up straight, and also to get it correct for the peculiarly-shaped head employed in large work. To do this the stave is again laid upon the carriage E and caused to lie exactly straight by two lugs, O O, which are formed on the ends of the racks P P. These racks are operated by gears on a connecting-shaft, and by suitable handles, so that both move together, and thus the stave is made to lie perfectly straight when it is secured by the clamps G, so that its center will stand exactly opposite an arm, R, which is hinged or pivoted to the carriage E. This arm can only be turned so as to stand at right angles with a longitudinal central line in the stave, so that a mark made by this arm will be straight across the center of the stave, which is then ready for use.

In my machine I do not confine myself to the use of any particular kind of a saw, as it is obvious several kinds may be adapted to it by ordinary mechanical means.

Having thus described my invention, what I claim as new, and desire to secure by Letters Patent, is—

1. In combination with the clamps G with their double-operating screws F, and the adjusting-lugs O O, I claim the hinged arm R, substantially as and for the purpose described.

2. I claim the adjustable elastic curved guides I, with their operating-screws J, for guiding the stave, either with or without a carriage, substantially as herein described.

3. A machine for working barrel-staves, consisting of the carriage E with its clamping and adjusting devices, the sawing-table with its adjustable gauge, the models K and M, and the crozing-cutter D, the whole constructed substantially as and for the purpose described.

In witness that the above-described invention is claimed by me I have hereunto set my hand and seal.

LAMARTINE R. FULDA. [L. S.]

Witnesses:
   GEO. H. STRONG,
   I. L. BOONE.